Figure 1:
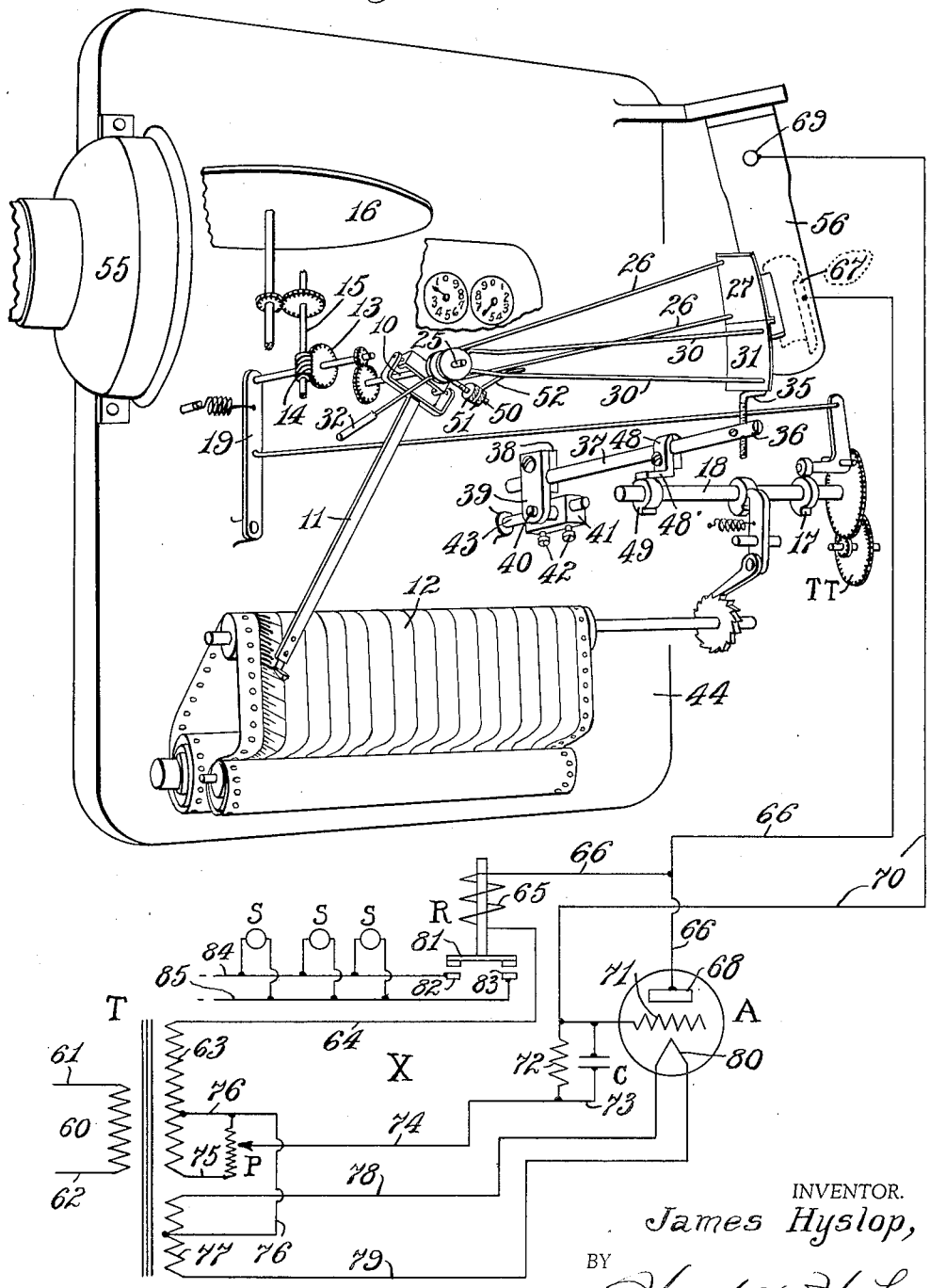

July 25, 1933.　　　　J. HYSLOP　　　　1,919,514

SIGNAL CONTROL FOR DEMAND METERS

Filed Dec. 27, 1932　　　3 Sheets-Sheet 1

INVENTOR.
James Hyslop,
BY Hood & Hahn
ATTORNEYS

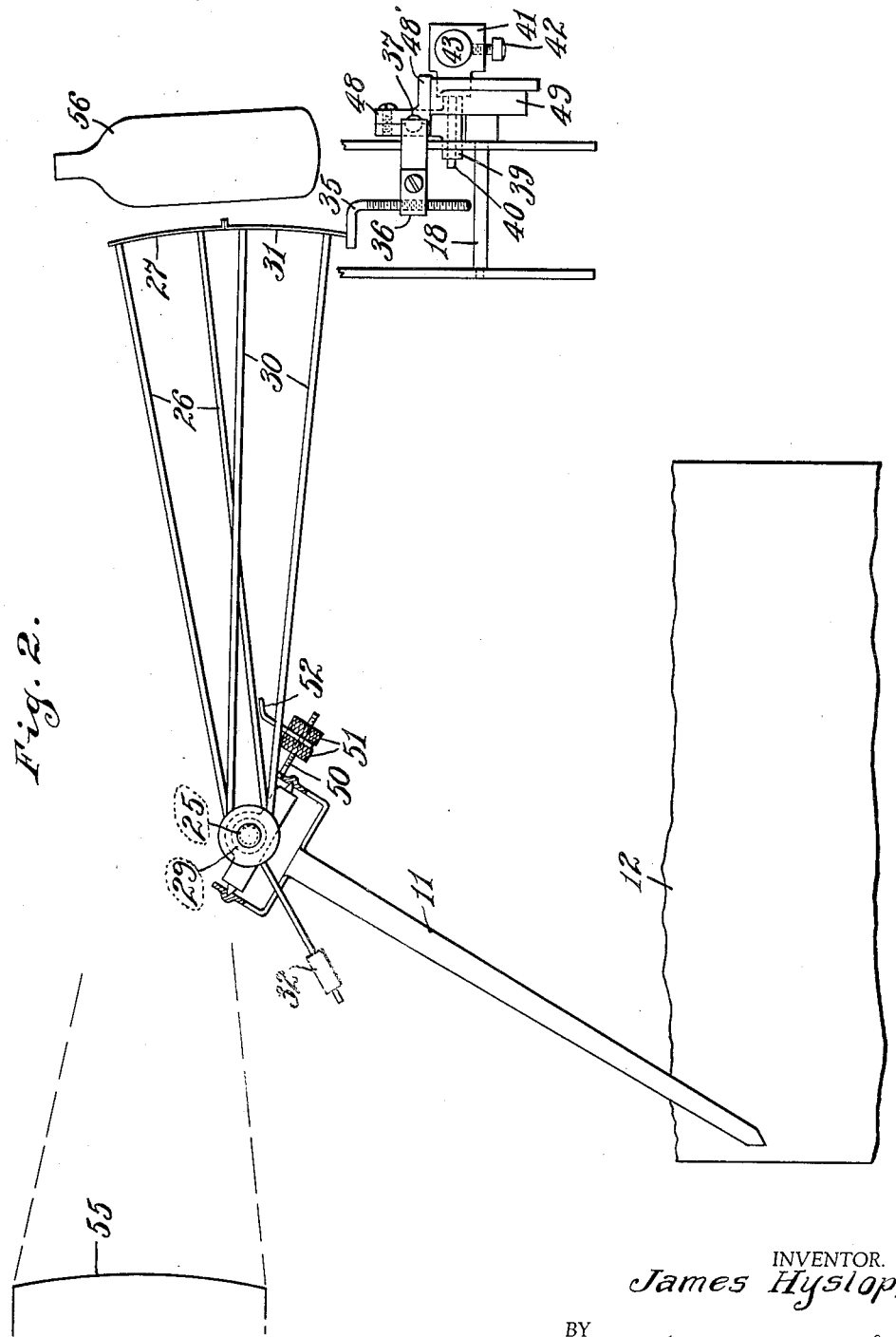

July 25, 1933. J. HYSLOP 1,919,514
SIGNAL CONTROL FOR DEMAND METERS
Filed Dec. 27, 1932 3 Sheets-Sheet 3
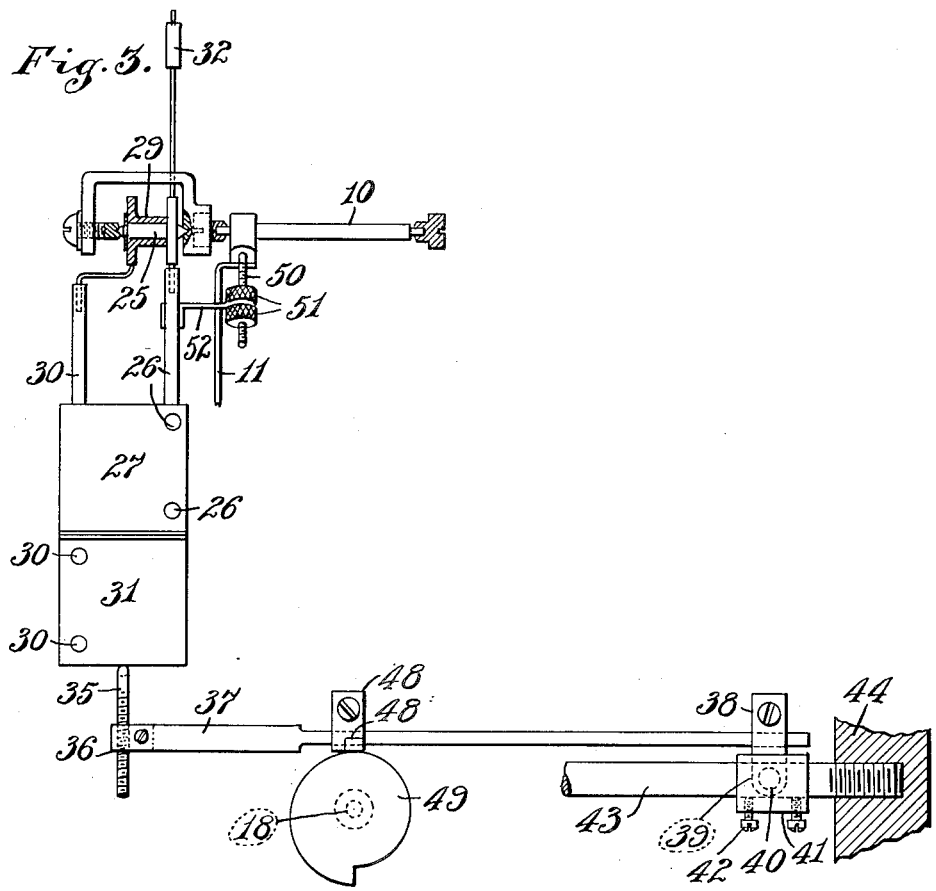
INVENTOR.
James Hyslop,
BY
Hood + Hahn
ATTORNEYS Patented July 25, 1933

1,919,514

UNITED STATES PATENT OFFICE

JAMES HYSLOP, OF TERRE HAUTE, INDIANA

SIGNAL CONTROL FOR DEMAND METERS

Application filed December 27, 1932. Serial No. 649,014.

Many users of large quantities of electric current are required to pay for the same at a minimum rate which is determined by peak demand. For instance, in some cases, a consumer, making a peak demand, even for only a few seconds, as for instance in the case of a short circuit or a momentary and unexpected, but easily avoidable, heavy load due to simultaneous energization of an unusual number of circuits, may necessarily establish a peak demand which, according to rules of some power companies, will require the consumer to pay unnecessarily high "readiness to serve" charges for the next following twelve months.

It is customary therefore, in order to make a record of demands for current, to place in the demand circuit a so-called demand meter which records total current consumption during successive predetermined time intervals. It is quite customary for operators to observe the operations of such meters and, if they find that in any particular predetermined period current consumption is proceeding at an abnormally high rate, to exercise care to avoid exceptionally heavy demands for current at times which might result in abnormally high current consumption during any predetermined time interval.

Where current consumption is under the control of a single operative who may readily constantly observe the recordings of the demand meter, it is quite possible for a careful operative to so control current demand as to avoid establishment of unusually high peak demands and, by so doing, effect very substantial savings in required payments for electric current.

Where, however, demands for current may originate at widely separated points and where some of these demands may be individually for large quantities of current for comparatively short periods, as for instance in mines where the hoisting machinery requires considerable current for comparatively short periods, it is practically impossible for the various operatives to keep sufficiently close track of the current recordings of the demand meter to enable them to avoid establishment of unnecessarily high peak demands.

The object of my invention is to provide comparatively simple mechanism for use in association with a demand meter which will be continuously responsive to the rate of current consumption in such manner as to give an easily recognizable signal, or signals, which may be established at any desired point or points remote from the meter, by means of which various operatives controlling current demand may be currently advised that the rate of current consumption has been undesirably accelerated, so that those operatives may refrain, for predetermined intervals, from making demands for current.

The accompanying drawings illustrate my invention.

Fig. 1 is a schematic diagram of an embodiment of my invention;

Fig. 2 an elevation, somewhat diagrammatic in character;

Fig. 3 an elevation at right angles to Fig. 2.

In the drawings 10 indicates the oscillating shaft of a demand meter of well-known type which carries the recording-pen arm 11 of such meter, the pen of said arm traversing the chart strip 12 which is progressively advanced at predetermined intervals by a suitable time train TT, the oscillations of said arm 11 being at regular time intervals and the amplitude of oscillations being responsive to total current consumption within the predetermined time interval.

For this purpose shaft 10 usually is driven by a shaft having worm wheel 13 which is normally meshed by a worm 14 carried by shaft 15 connected to the disk 16 of the meter and worm wheel 13 is intermittently, at the ends of predetermined time intervals (say for instance fifteen minutes, or thirty minutes, or one hour, etc.) retracted from mesh with worm 14 so that the recording arm 11 will be returned to zero position, the chart 12 being advanced through a predetermined distance during each period of arm return. Wheel 13 is retracted from worm 14 by well-known mechanism which I have illustrated diagrammatically by the trip cam 17 on the time train shaft 18 and arranged to actuate an arm 19 non-rotatively associated with shaft 15. It is to be understood that the mechanism which I have shown for intermittently driving and releasing shaft 10 is merely diagrammatic, such mechanisms being well-known parts of standard demand meters.

In order that an undesirably high peak demand may not be established during any predetermined time interval, it is of course necessary that arm 11 shall not be caused, as a result of current demand, to move through too wide an arc during any recording time interval. The amplitude of recording arm movement is, of course, determined by the rate of current demand and, as this rate may and does fluctuate widely during various time intervals the likelihood of too great movement of the recording arm may be due to unnecessarily great current demand at any time during the predetermined time interval.

The problem to be solved therefore, is to provide two coordinated relatively movable elements, both of which may be positioned without relative variation in response to elapsed time and one of which may be positioned relative to the other throughout the entire range of elapsed time-positioning in response to the current-consumption positioning of the recording arm 11.

As a solution of this problem I provide the following mechanism:

Coaxial with shaft 10 is a spindle 25 carrying a pair of arms 26, 26 to the outer ends of which is secured a shield 27. Journaled upon spindle 25 is a sleeve 29 carrying radially-extending arms 30, 30 to which is secured a shield 31 mating with shield 27.

The weight of arms 26 and shield 27 is nearly counter-balanced by the counter-balanced weight 32, just enough of the weight of shield 27 being unbalanced to insure normal resting of its lower edge upon the upper edge of shield 31.

Shield 31 rests upon a pin 35 which is adjustable in the clamp 36 carried at the outer end of an arm 37 which is longitudinally adjustable in clamp 38 carried by arm 39 which is pivoted at 40 on a carriage 41 which may be held in various positions of adjustment by clamping screws 42 on a pin 43 carried by the main frame 44 of the meter, the adjustment of the carriage 41 being substantially parallel with arm 37.

Longitudinally adjustable on arm 37 is a block 48 provided with a foot 48' arranged to rest upon cam 49 carried by shaft 18.

Attached to arm 11 is a threaded pin 50 to which is adjustably clamped, by nuts 51, a finger 52 arranged to have a one-way lifting engagement with one of the arms 26 of shield 27.

A suitable source of light or radiant energy 55 is arranged upon one side of shields 27—31 and a light-responsive or radiant-responsive element 56, such for instance as an ordinary photo-electric cell having an eye of substantially the same extent as the maximum amplitude of movement of shields 27—31 under the influence of arm 37, is arranged on the other side of said shields 27—31, and this cell is placed in a suitable amplifying signaling circuit X, the details of which are well-known, by means of which suitable signals, at desired remote points, may be given in response to variations in condition of element 56.

The signaling circuit is preferably of a closed-circuit type, i. e., one wherein no signal is given unless energy flow through the element 56 is modified to a predetermined extent. Such a circuit might incorporate a normally energized relay R which would cause energization of the signal S only upon predetermined modification of current flow through the element 56.

The operation is as follows:

Worm 14 being in mesh with wheel 13 arm 11 will be caused to traverse record strip 12 in response to movement of disk 16 of the meter, which movement is in response to current consumption.

At the same time shields 27 and 31, which are normally coordinated to obstruct energy flow from 55 to 56, will be simultaneously raised by the action of cam 49 on arm 37. Cam 49 will be so designed as to move shields 27 and 31 simultaneously at a rate equal with a desired average current consumption rate and therefore so long as actual current consumption during any expired portion of the predetermined time interval has not exceeded current consumption for that expired time interval computed at a predetermined desired average, finger 52 will have no effect upon shield 27 and element 56 will be guarded against the effect of energy emanating from source 55.

If, however, at any time, current consumption is proceeding at too high a rate finger 52 will engage arm 26 so as to lift shield 27 from shield 31, thereby permitting element 56 to be affected to produce a signal in the signaling circuit X, whereupon previously instructed operatives, such for instance as those who are controlling large-demand instrumentalities, such as hoisting motors, will, during the persistence of such signal (and for a specified short-time interval thereafter if so desired) refrain from current consumption.

Shield 31 will of course be advancing at a uniform rate so that, if current consumption is not too great, it will catch up with shield 27, thus causing a discontinuance of signal in circuit X.

When shaft 18 has completed one revolution finger 17 will cause a retraction of wheel 13 from worm 14 and at the same time the high point on cam 49 will pass from beneath arm 48' so that the recording arm 11 will be returned to zero and shields 27—31 will be returned to initial position and the cycle will be repeated.

It will be readily understood that circuit X may be arranged so that its signals will be either visual or audible or both or so that circuit breakers in the demand circuit may be actuated, all by perfectly well-known means and without departing from the spirit of my invention.

I have shown in Fig. 1 a possible circuit arrangement including the photoelectric cell 56, relay R and signals S but it will be readily understood that other circuits accomplishing the same result might be evolved without departing from the spirit of my invention. In this arrangement the primary 60 of transformer T is connected to line wires 61 and 62. The secondary winding 63 of transformer T has one end connected by wire 64 with coil 65 of relay R and this coil is connected through the branched wire 66 with plate 67 of tube 56 and with the plate 68 of an amplifier tube A. Terminal 69 of tube 56 is connected by wire 70 with the grid 71 of tube A and with one end of the grid resistor 72 and one side of the grid condenser C, the other side of said grid condenser being connected by wire 73 with the other end of grid resistor 72 which, through wire 74, is connected to the movable arm of potentiometer P connected by wires 75 and 76 with winding 63, wire 76 being also connected to the middle of another secondary winding 77 of transformer T, the ends of which winding are connected respectively by the wires 78 and 79 with the filament 80 of the amplifier tube A.

The contact arm 81 of relay R is normally held out of contact with terminals 82 and 83 of the signal line 84—85 to which the signals S, S are connected.

So long as sufficient light is not thrown upon the cell 56 there will be sufficient current through coil 65 to keep contact 81 out of contact with terminals 82 and 83 and signals S will not be energized but whenever, as a result of separation of shield 27 from 31, sufficient light from source 55 is permitted to fall upon tube 56, current through coil 65 will be decreased to a point which will connect the bridging contact 81 to bridge terminals 82 and 83 and thereby energize the signals.

It will be readily understood that other light sensitive devices, such for instance as the Weston Photronic relay might be substituted for the photoelectric cell without departing from my invention.

I claim as my invention:

1. The combination of an energy-sensitive element, signaling means responsive to changes in condition of said element, an energy source arranged to affect said energy-sensitive element, a pair of coacting shields interposed between said source and said energy-sensitive element, means for cyclically simultaneously shifting said shields while maintaining shielding value thereof, and means independent of said last-mentioned means movable through a predetermined cycle for causing relative movement of said shields to thereby vary their shielding value.

2. The combination of an energy-sensitive element, signaling means responsive to changes in condition of said element, an energy source arranged to affect said energy-sensitive element, shielding means interposed between said source and said element, a time train, a shield manipulator actuated by said time train, means movable through a predetermined cycle in response to conditions independent of the time train and a shield manipulator responsive to said last-mentioned means, said two shield-manipulators being so coordinated with the shielding means as to alter its shielding value whenever total movement of the last-mentioned shield-manipulator exceeds total movement of the first-mentioned shield manipulator.

3. The combination of an electric meter having a cyclically movable element responsive to meter-advancement, a photo-electric cell, signaling means responsive to changes of current through said cell, a light source focused on said cell, a pair of cooperating shields interposed between said cell and said light source and together capable of shielding said cell from the light source, a time train, means actuated by said time train for cyclically simultaneously shifting both said shields without relative movement, and means actuated by said cyclically-movable meter-responsive element for shifting one shield relative to the other to vary shielding value whenever total movement of the meter-responsive element exceeds total movement of the time-train shield-shifting means.

4. The combination of an electric meter having a cyclically movable element responsive to meter-advancement, a photo-electric cell, signaling means responsive to changes of current through said cell, a light source focused on said cell, a pair of cooperating shields interposed between said cell and said light source and together capable of shielding said cell from the light source, a time-train, shield-shifting means responsive to time-train movement, and shield-shifting means responsive to meter advancement, said two shield-shifting means being so coordinated with the shields as to produce movement of one shield relative to the other whenever total movement of the meter-responsive shifting means exceeds total movement of the time-train-responsive shifting means.

5. The combination of an electric meter having a cyclically-movable element responsive to meter advancement, an electric energy-source, an element responsive to energy emanating from said source, signaling means responsive to variations of condition of said last-mentioned element, shielding means interposed between said source and said element, a time-train, and means for varying the effectiveness of said shielding means comprising two relatively movable elements one dominated by the time-train and one by the cyclically movable element of the meter and so coordinated as to produce shielding variation whenever total movement of the meter-dominated element exceeds total movement of the time-train dominated element during predetermined elapsed time periods.

6. The combination, with a demand electric meter comprising a time-train and a cyclically-movable arm responsive to current flow through the meter, of a photo-electric cell signaling means responsive to changes in said cell, a light source coordinated with said cell, a pair of cooperating shields interposed between said cell and light source, means actuated by the time train for simultaneously moving both shields without relative movement through successive cycles and means actuated in synchronism with the said cyclically-movable arm for shifting one shield relative to its fellow whenever total arm movement during a predetermined elapsed time exceeds total time-train movement during the same time period.

7. The combination, with a demand electric meter comprising a time-train, a cyclically oscillatable arm responsive in one direction to current flow through the meter and means controlled by the time train for causing return of said arm to initial position at predetermined time intervals, of two supplementing oscillatable shields each journaled on an axis substantially coincident with the arm axis, one-way engaging means between said arm and one of said shields, means controlled by the time-train for causing cyclic oscillations of both said shields, a photoelectric cell arranged in position to be shaded by said shields when they are both under control of the time-train and to be exposed when one of said shields is under the influence of the meter arm, signaling means controlled by the photoelectric cell, and a light source focused on said cell and arranged in position to be shaded by said shields.

8. The combination, with a demand electric meter comprising a time-train, a cyclically oscillatable arm responsive in one direction to current flow through the meter and means controlled by the time-train for causing return of said arm to initial position at predetermined time-intervals, of two supplementing oscillatable shields, each journaled on an axis substantially coincident with the arm axis, one-way engaging means between said arm and one of said shields, means controlled by the time-train for causing cyclic oscillations of both said shields, an energy source and an element responsive to said energy source coordinated with said shields in such manner that said last-mentioned element will be variably affected by the energy source on the one hand when both shields are wholly under the influence of the time-train and on the other hand when one of said shields is under the influence of the meter arm, and signalling means controlled by said element responsive to said energy source.

9. The combination of two substantially coaxial oscillatable shields, means for simultaneously and coextensively oscillating said shields, oscillataole means cyclically synchronized with said last means for moving one of said shields in one direction independently of its fellow, means independent of said first-mentioned means for moving said last-mentioned means in one direction independently of said first-mentioned means, an energy source and an element responsive to said energy source so coordinated with said two shields that said last-mentioned element will be affected by the energy source due to movement of one shield relative to its fellow, and signalling means controlled by said last-mentioned element.

10. The combination of two substantially coaxial oscillatable shields, means for simultaneously and coextensively oscillating said shields, oscillatable means cyclically synchronized with said last-mentioned means for moving one of said shields in one direction independently of its fellow, means independent of said first-mentioned means for moving said last-mentioned means in one direction independently of said first-mentioned means, a photoelectric cell and a light source arranged on opposite sides of said shields, and signaling means controlled by said cell.

11. The combination of two substantially coaxial oscillatable shields, a time-train, means actuated by said time-train to simultaneously oscillate said two shields, a cyclically-movable element, means controlled by the time-train for intermittently causing return of said element, means independent of the time-train for advancing said cyclically-movable element from its initial position and means synchronized with said last-mentioned element for one-way engagement with one of said shields to advance it independently of the time-train.

12. The combination, with a demand meter comprising a time-train, a cyclically movable element, means controlled by the time train for causing return of said cyclically movable element to initial position from any position of advancement, and means controlled by current flow for advancing said cyclically-movable element from initial position, of signaling-means, two cooperating cyclically-movable elements controlling said signaling means, means controlled by the time-train for simultaneously moving both of said two cyclically-movable elements, and means controlled by the cyclically-movable element of the meter to move one of said two cooperating cyclically-movable elements relative to its fellow to vary the effect of said two elements on the signaling means.

JAMES HYSLOP.